(12) United States Patent
Bagheri

(10) Patent No.: US 12,309,492 B2
(45) Date of Patent: May 20, 2025

(54) TEXTURE BASED AUTO EXPOSURE CONTROL ALGORITHM

(71) Applicant: Meta Platforms Technologies, LLC, Menlo Park, CA (US)

(72) Inventor: Saeid Bagheri, Costa Mesa, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 54 days.

(21) Appl. No.: 18/180,703

(22) Filed: Mar. 8, 2023

(65) Prior Publication Data

US 2024/0305885 A1 Sep. 12, 2024

(51) Int. Cl.

| H04N 23/67 | (2023.01) |
| G06T 7/246 | (2017.01) |
| G06T 7/41 | (2017.01) |
| G06T 7/73 | (2017.01) |
| H04N 23/73 | (2023.01) |

(52) U.S. Cl.
CPC .......... H04N 23/675 (2023.01); G06T 7/246 (2017.01); G06T 7/41 (2017.01); G06T 7/73 (2017.01); G06T 2207/10016 (2013.01); H04N 23/73 (2023.01)

(58) Field of Classification Search
CPC ...... H04N 23/675; H04N 23/73; H04N 23/71; H04N 23/72; H04N 23/76; H04N 23/67; H04N 23/743; G06T 7/246; G06T 7/41; G06T 7/73; G06T 2207/10016; G02B 27/017; G02B 27/0179
See application file for complete search history.

(56) References Cited

U.S. PATENT DOCUMENTS

| 4,839,807 | A * | 6/1989 | Doi ................. G16H 15/00 382/128 |
| 6,714,665 | B1 * | 3/2004 | Hanna ............... G07C 9/37 382/209 |
| 8,290,357 | B2 | 10/2012 | Dey et al. |
| 8,773,577 | B2 | 7/2014 | Velarde et al. |
| 9,894,285 | B1 | 2/2018 | Chen et al. |
| 11,087,443 | B2 | 8/2021 | Chen |
| 2006/0153471 | A1 | 7/2006 | Lim et al. |

(Continued)

OTHER PUBLICATIONS

Jantunen H., "Software Implementation of Contrast-Based Autofocus in Mobile Camera System," Master of Science Thesis, Software Engineering Department, Apr. 2014, 62 pages.

(Continued)

*Primary Examiner* — Michael E Teitelbaum
(74) *Attorney, Agent, or Firm* — Greenberg Traurig, LLP

(57) ABSTRACT

In one embodiment, a method includes accessing texture information generated and used by an autofocus unit to determine an autofocus configuration for a camera, the texture information including texture statistics detected in an environment sensed by the camera. The method further includes selecting a region of interest within a field of view of the camera based on the texture information, and determining an autoexposure configuration for the camera based on the region of interest. The method further includes capturing an image of the environment using the autoexposure configuration and the autofocus configuration, and tracking objects in the environment using the image.

20 Claims, 10 Drawing Sheets

(56) References Cited

U.S. PATENT DOCUMENTS

| | | | |
|---|---|---|---|
| 2006/0188168 A1* | 8/2006 | Sheraizin | G06T 5/50 |
| | | | 382/233 |
| 2007/0003151 A1* | 1/2007 | Kawahara | H04N 19/17 |
| | | | 348/222.1 |
| 2019/0230297 A1 | 7/2019 | Knorr et al. | |
| 2022/0076018 A1 | 3/2022 | Geiss et al. | |
| 2023/0015621 A1 | 1/2023 | Feng et al. | |
| 2023/0021016 A1* | 1/2023 | Feng | G06T 7/10 |
| 2023/0233091 A1* | 7/2023 | Kadambi | A61B 5/02055 |
| | | | 600/301 |

OTHER PUBLICATIONS

Nguyen T.T., et al., "Camera Auto-Exposing and Auto-Focusing for Edge-Related Applications Using a Particle Filter," IEEE/RSJ International Conference on Intelligent Robots and Systems, Oct. 18-22, 2010, pp. 1177-1182.

Christodoulou S.E., et al., "Pavement Defects Detection and Classification Using Smartphone-Based Vibration and Video Signals," SAT 2015 18th International Conference, Springer, May 19, 2018, pp. 125-138.

European Search Report for European Patent Application No. 24154912.0, dated Jun. 21, 2024, 10 pages.

* cited by examiner

TEXTURE BASED AUTO EXPOSURE CONTROL ALGORITHM

TECHNICAL FIELD

This disclosure generally relates to camera exposure and tracking objects in an environment.

BACKGROUND

Artificial reality is a form of reality that has been adjusted in some manner before presentation to a user, which may include, e.g., an artificial reality (artificial reality), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Embodiments described herein cover systems, methods, and media to automatically adjust the exposure on a sensor, e.g., a camera or cameras, capturing the environment of an artificial reality device. By dynamically evaluating image data of an environment, embodiments disclosed herein automatically adjust camera exposure to the optimal brightness for tracking points of reference within the surrounding environment. The disclosed embodiments are useful for a variety of applications, for example artificial reality device tracking.

In one embodiment, a computing system may receive image data (e.g., image frames of a video) comprising a perspective of an environment and utilize one or more techniques described herein to automatically adjust the exposure on the image or video capturing sensor (e.g., camera or cameras). In particular embodiments, a computing system may further utilize, for example and not by way of limitation, autofocus and autoexposure techniques to identify regions (e.g., spatial areas) within an image frame that contain sufficient useful texture information in order to be used as a point of reference for an automatic exposure control algorithm. The techniques described herein improve upon existing technology by providing an automatic sensor exposure control that takes into account image texture information and improves the identification of prominent features in the surrounding environment that can be used for device tracking for providing a more immersive experience to a user.

Certain technical challenges exist for identifying the optimal image brightness for tracking the surrounding environment. One technical challenge may include that the optimal brightness for human eyes to view the details of the scene may not be the same as the optimal brightness for tracking the surrounding environment of an artificial reality system. Another technical challenge may be keeping the overall image from being over-exposed such that trackable features are obscured and thus not useful for device tracking. The solution presented by the embodiments disclosed herein to address this challenge may be to determine which regions (e.g., spatial areas) of an image frame contain features that may be useful for tracking purposes, and to optimize exposure decisions based on information in those regions of the image frame.

Embodiments of the invention may include or be implemented in conjunction with an artificial reality system. Artificial reality is a form of reality that has been adjusted in some manner before presentation to a user, which may include, for example, an artificial reality (artificial reality), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
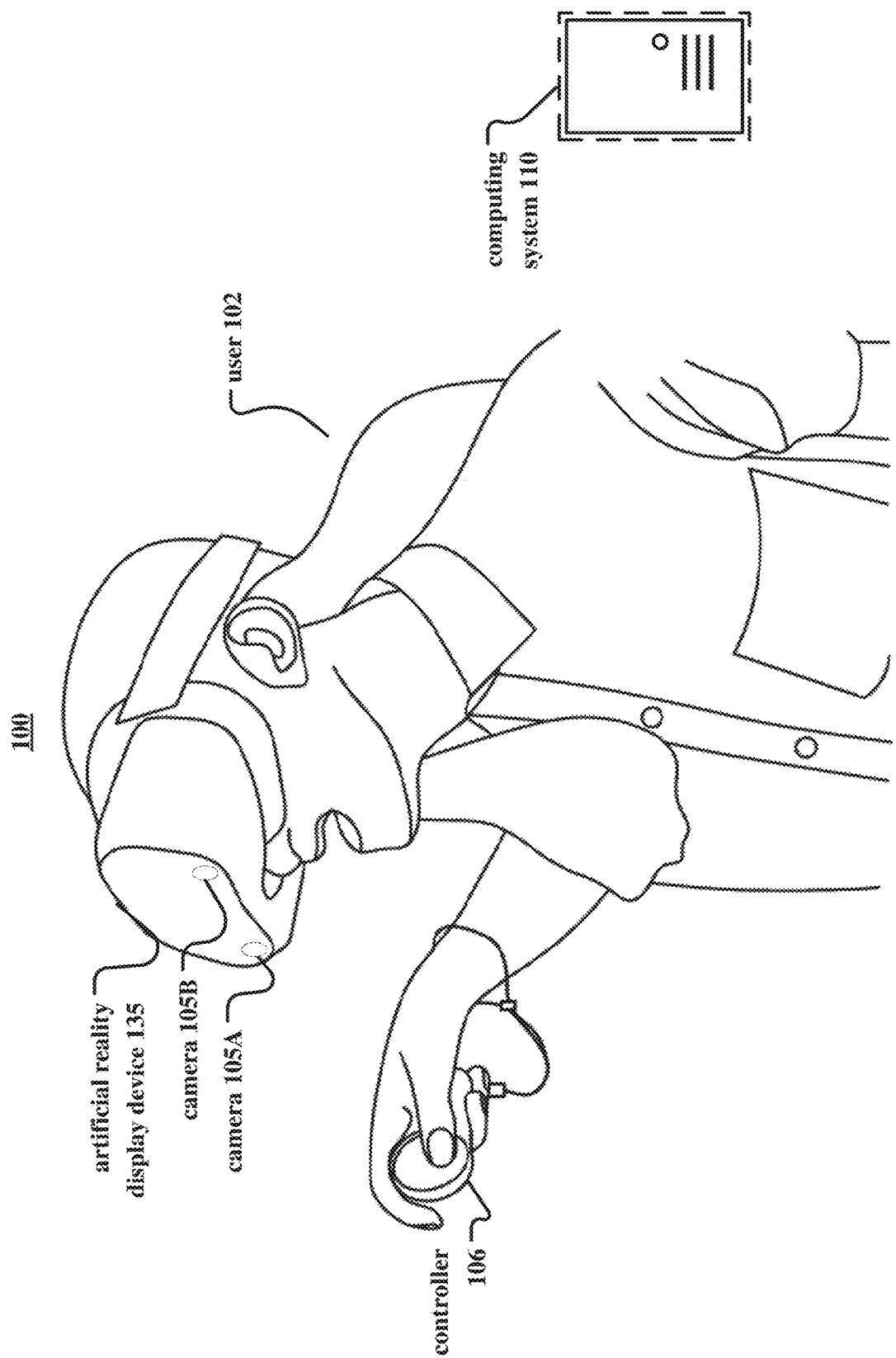
FIG. 1 illustrates an example artificial reality system.

FIG. 1 illustrates an example artificial reality system 100 and a user 102. In particular embodiments, the artificial reality system 100 may comprise a head-mounted artificial reality display device 135, a controller 106, and one or more computing systems 110. The artificial reality display device 135 may be worn over the user's eyes and provide visual content to the user 102 through internal displays (not shown). The artificial reality display device 135 may have two separate internal displays, one for each eye of the user 102 (single display devices are also possible).

The artificial reality system 100 may further have one or more controllers 106 that enable the user 102 to provide inputs. The controller 106 may communicate with the artificial reality display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. As an example and not by way of limitation, the controller 106 may have several infrared LEDs or other known observable features that collectively form a predetermined pattern. Using a sensor or camera, the artificial reality system 100 may be able to capture an image of the predetermined pattern on the controller. Based on the observed orientation of those patterns, the system may compute the controller's position and orientation relative to the sensor or camera.

The artificial reality system 100 may further include a one or more computing systems 110. The computing systems 110 may control the artificial reality display device 135 and the controller 106 to provide the artificial reality content to and receive inputs from the user 102. The one or more computing systems 110 may be a stand-alone unit that is physically separate from the artificial reality display device 135 or the computer system 110 may be integrated with the artificial reality display device 135. In embodiments where the one or more computing systems 110 is a separate unit, the one or more computing systems 110 may be communicatively coupled to the artificial reality display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depend upon the capabilities of its one or more computing systems 110.

In particular embodiments, the computing systems 110 may receive sensor data from one or more components of the artificial reality system 100. For example and not by way of limitation, the artificial reality display device 135 may include one or more external-facing cameras that capture a sequence of frames (e.g., as a video). The sensor data provided by such sensors may be used by the computing systems 110 to determine the device's current orientation and provide that orientation to the rendering engine to orient/reorient the virtual camera in the 3D space. In particular embodiments the computing systems 110 may utilize one or more sensor data with one or more tracking techniques to determine a pose of one or more components of artificial reality system 100.

Figure 2:
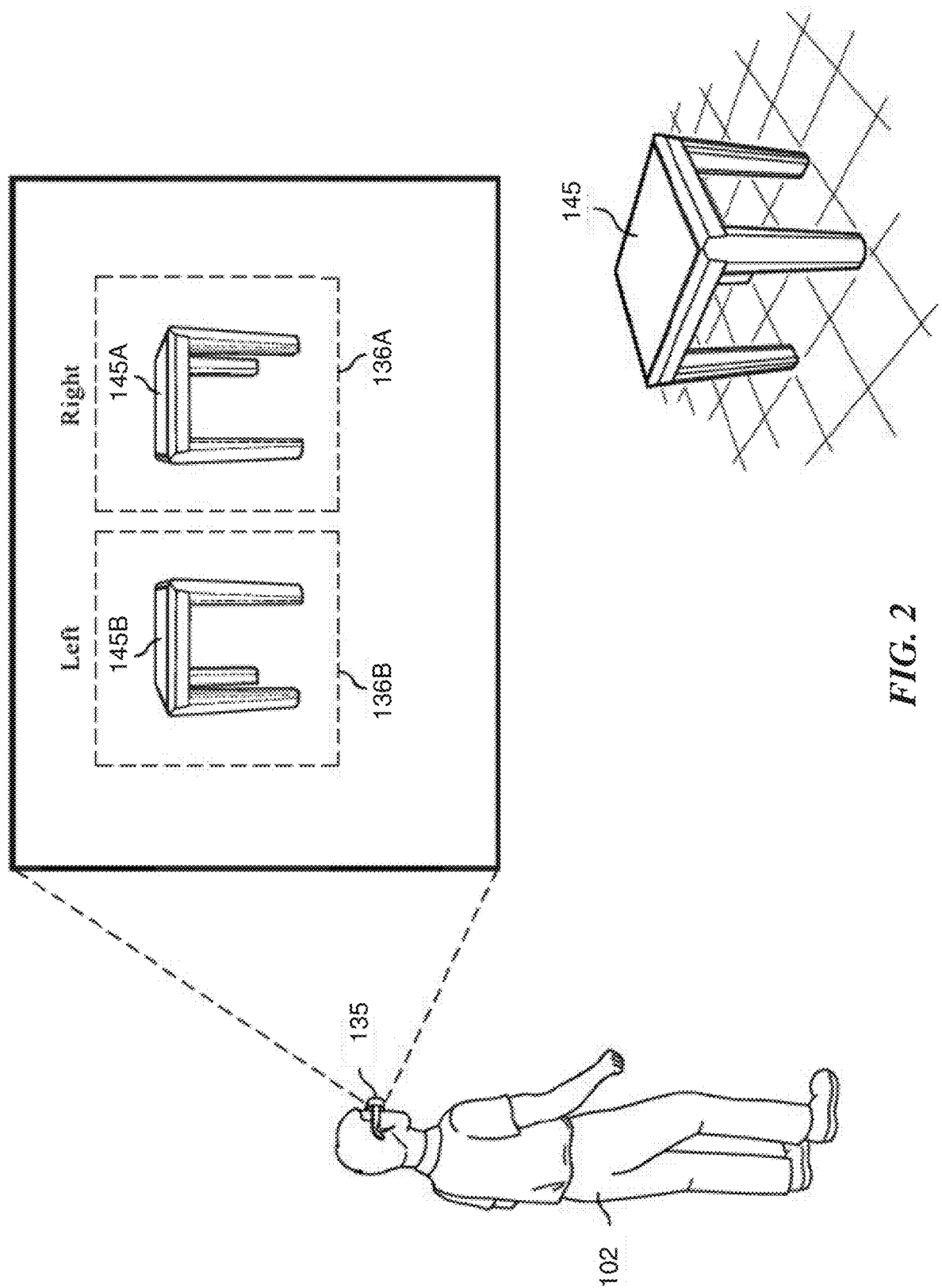
FIG. 2 illustrates exemplary frame data captured from sensors on an artificial reality display device.

FIG. 2 illustrates exemplary frame data captured from sensors on an artificial reality display device. A user 102 may be wearing an artificial reality display device 135, immersed within an artificial reality environment. A real-world object 145 is in the physical environment surrounding the user 102. Information about the physical environment surrounding the user may be captured using, for example, one or more cameras 105 such as external-facing cameras 105A-B (illustrated in FIG. 1). The artificial reality display device 135 may have external-facing cameras, such as the two forward-facing cameras 105A and 105B shown in FIG. 1. While only two forward-facing cameras 105A-B are shown, the artificial reality display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). Images captured by the forward-facing cameras may contain features present in the environment that may aid in the artificial reality display device's ability to track the environment and, for example, its position and orientation within the environment, to provide an immersive experience to the user.

In particular embodiments, the pose (e.g., position and orientation) of the artificial reality display device 135 within the environment may be needed. For example, in order to render the appropriate display for the user 102 while she is moving about in a virtual environment, the artificial reality system 100 may need to determine her position and orientation at any moment. Based on the pose of the artificial reality display device, the artificial reality system 100 may further determine the viewpoint of either of the cameras 105A and 105B or either of the user's eyes. The data generated by the external-facing cameras 105A-B allow the artificial reality system 100 to compute the pose of the artificial reality display device 135 using, for example, SLAM (simultaneous localization and mapping) or other suitable tracking techniques.

Figure 3:
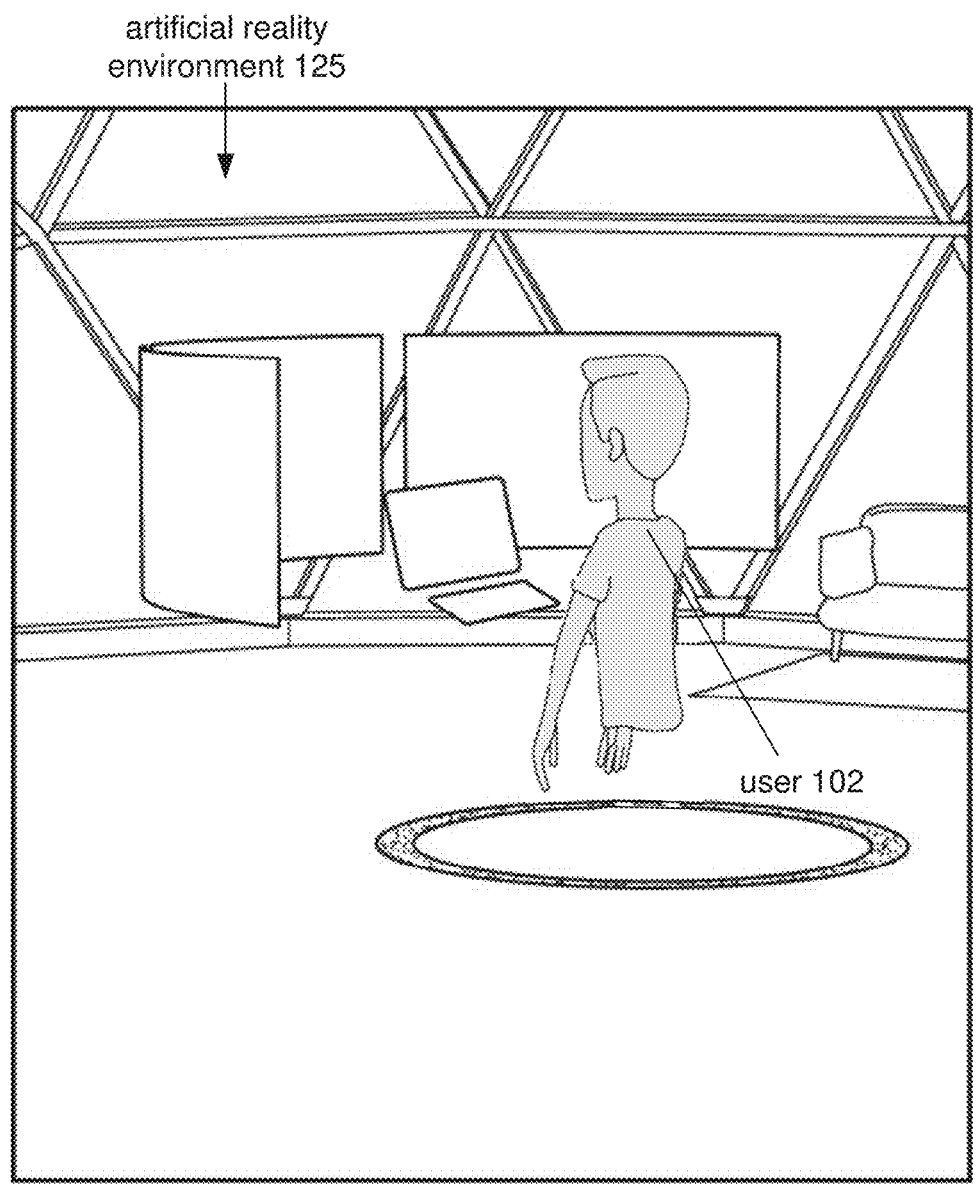
FIG. 3 illustrates an example user in an artificial reality environment.

FIG. 3 illustrates an example user in an artificial reality environment. The user 102 may be wearing an artificial reality display device 135 (not illustrated). The user 102 may be represented by an avatar in the artificial reality environment 125, as illustrated in FIG. 3. Using the artificial reality display device 135, the user may view the artificial reality environment 125 as rendered by the computer systems 110 based on, for example, position and orientation of the artificial reality display device within the surrounding environment.

An embodiment of the automatic exposure control may be designed as follows. Through the external-facing cameras 105A-B of the artificial reality display device 135, a sequence of image frames of the surrounding physical environment may be captured. The frame data captured by the cameras 105A-B, however, may have unsatisfactory brightness levels such that any environmental features captured in the sequence of image frames are not useful for tracking the artificial reality display device within the environment. For example, the captured image frames may be too bright for tracking algorithms which may require prominent features to be captured. Alternatively, the captured image frames may be too dark to discern prominent features usable by the tracking algorithm. As such, simply utilizing what the cameras 105A-B captured may not be optimally useful for a tracking technique and thus may not provide the best possible immersive experience. Utilizing what the cameras 105A-B captured with an auto exposure control algorithm not considering prominent tracking features may lead to exposure decisions based on noisy data, data that is not useful to a tracking technique, or data that would negatively impact performance (such as a very dark or very bright region of a frame, e.g., from a bright direct light).

Artificial reality systems are utilized for a variety of applications, including allowing a user to experience moving about in a virtual environment, which may involve tracking features of the physical environment surrounding the artificial reality display device using sensors, such as one or more cameras. Cameras commonly use automatic exposure control (AEC) algorithms to adjust the brightness of captured image frames. These AEC algorithms are commonly optimized for the purpose of allowing human eyes to visualize details of a captured environment. These AEC algorithms may modify the exposure of an image frame by taking into account the brightness level of the overall image or the brightness level of the center field of view of the image. Other cameras may use AEC algorithms which make exposure decisions based on tracking of faces within the image or based on a point selected by a user, but these AEC algorithms do not take into account image details which may be used with tracking techniques when the details are optimally exposed. Artificial reality systems which use sensors to capture environmental data for the purpose of tracking may benefit from exposure techniques which take into account that some regions of an image frame may contain captured environmental features that could be used with tracking techniques and thus are the regions that should be well exposed such that they are usable to the tracking techniques. Conversely, these artificial reality systems may benefit from tracking techniques that take into account that other regions of an image frame may not contain captured environmental features and would not need to be considered for exposure decisions. It would be useful to provide a technique for optimizing frame exposure in which the AEC algorithm considers regions of a frame containing useful detail information and not considering regions of an image frame that do not contain useful detail information.

The present disclosure improves upon existing automatic exposure control (AEC) algorithms by using techniques to identify a region of interest (ROI) of a frame that contains information (e.g., prominent environmental features) that may be used by a tracking technique of an artificial reality system. Features in a surrounding environment that may be used by a tracking technique include, but are not limited to, corners of walls or objects, and texture or detail of objects or spatial areas of the surrounding environment. The AEC algorithm may then present an output (e.g., an exposure or gain) based on the identified region of interest (ROI) such that the exposure of a frame is optimized for the region of interest (ROI) which contains such information.

In particular embodiments, a sensor associated with an artificial reality system may capture the physical environment around the user and may do so continuously to generate a sequence of frames (e.g., as a video). The frames may contain information about the environment surrounding the sensor, including walls and objects. A frame may also be referred to as an image plane. FIG. 2, as previously explained, illustrates exemplary frame data captured from sensors on an artificial reality display device, showing information about the environment surrounding the sensor, including real-world object 145. For a frame captured by a sensor, a region of interest (ROI) may be determined. The ROI may, for example, comprise a plurality of regions of the frame. Specifically, the ROI may comprise a plurality of two-dimensional spatial areas on the image plane. The ROI may comprise a plurality of non-overlapping regions. An ROI may be determined using frame average AEC region of interest (ROI) algorithm. An ROI may be determined using center-weighted AEC region of interest (ROI) algorithm. Cameras commonly use frame average and center-weighted regions of interest for existing automatic exposure control (AEC) algorithms to determine an ROI.

Figure 4A:
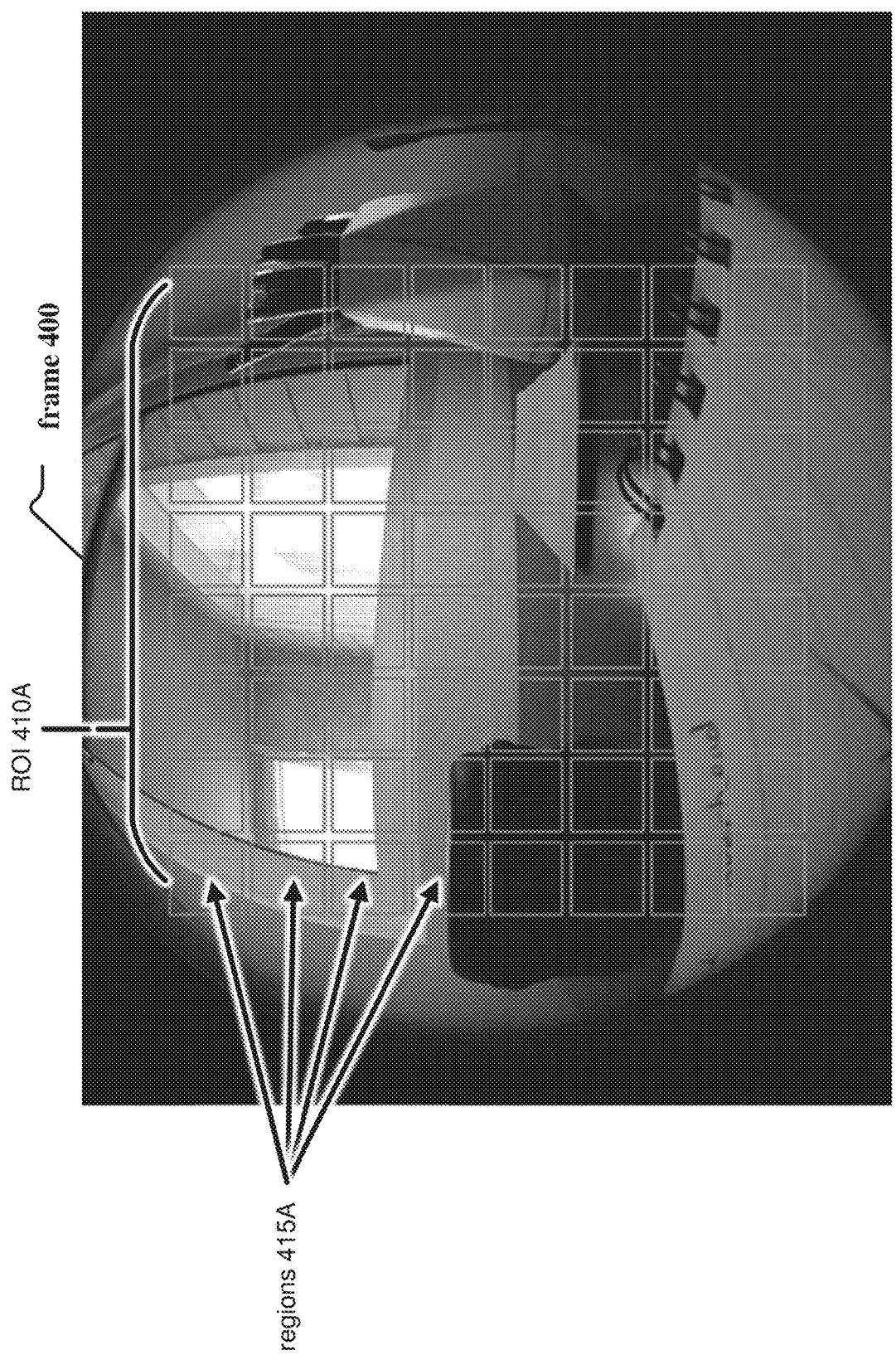
FIGS. 4A and 4B illustrate exemplary sets of regions of a frame captured by a sensor associated with an artificial reality system.
Figure 4B:
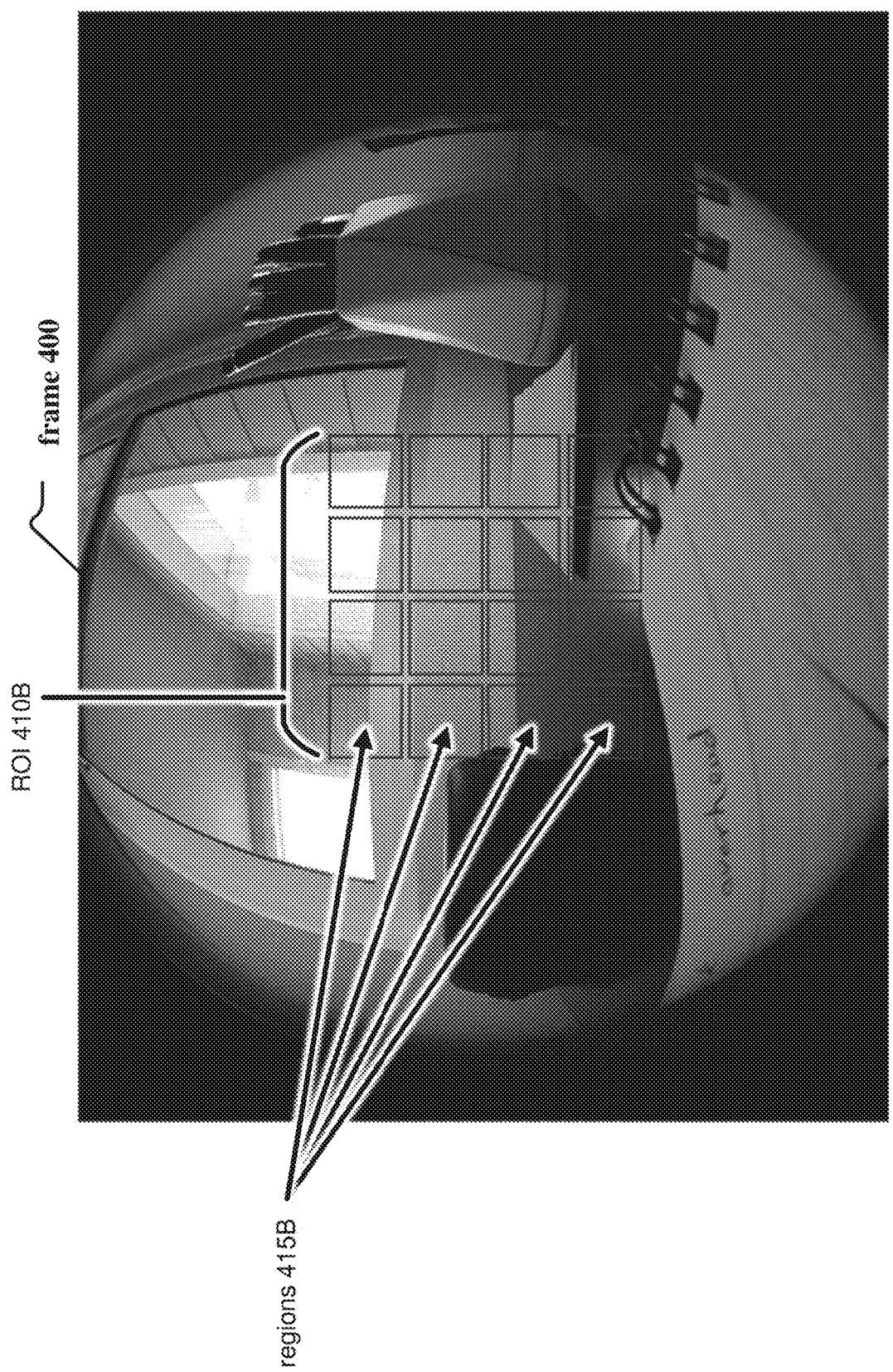

FIGS. 4A-4B illustrate exemplary regions of interest (ROIs) of a frame captured by a sensor associated with an artificial reality system. In FIG. 4A, ROI 410A is illustrated as, for example and not by way of limitation, a two-dimensional grid of squares visually overlaid on frame 400. ROI 410A is an illustration showing, for example, an application of a frame average AEC region of interest to frame 400. In FIG. 4B, ROI 410B is illustrated as, for example and not by way of limitation, a two-dimensional grid of squares visually overlaid on frame 400. ROI 410B is an illustration showing, for example, an application of a center-weighted AEC region of interest to frame 400.

In particular embodiments, a region of interest (ROI) for a frame may be determined by applying a texture based region selector. ROI may be determined by determining, using a texture based region selector, which region or regions of a frame contain information which may be used by a tracking algorithm. For a frame, information associated with frame texture may be generated. Frame texture information may comprise statistics created using autofocus and/or autoexposure techniques. As an example, an autofocus statistics generator may generate texture statistics for the frame. Frame texture information may also be generated in connection with a fixed focus camera not employing autofocus. It will be understood that "texture statistics" may refer to texture information generated by an autofocus algorithm (referred to as "autofocus statistics") or without the use of autofocus. The texture statistics may comprise a set of statistics associated with a set of regions of the frame. As an example, the texture statistics generator may generate texture statistics for each of the regions 415A of frame 400 in FIG. 4A. For instance, each of the regions 415A may have a value generated, associating each region with an amount of texture present in the region.

Figure 5:
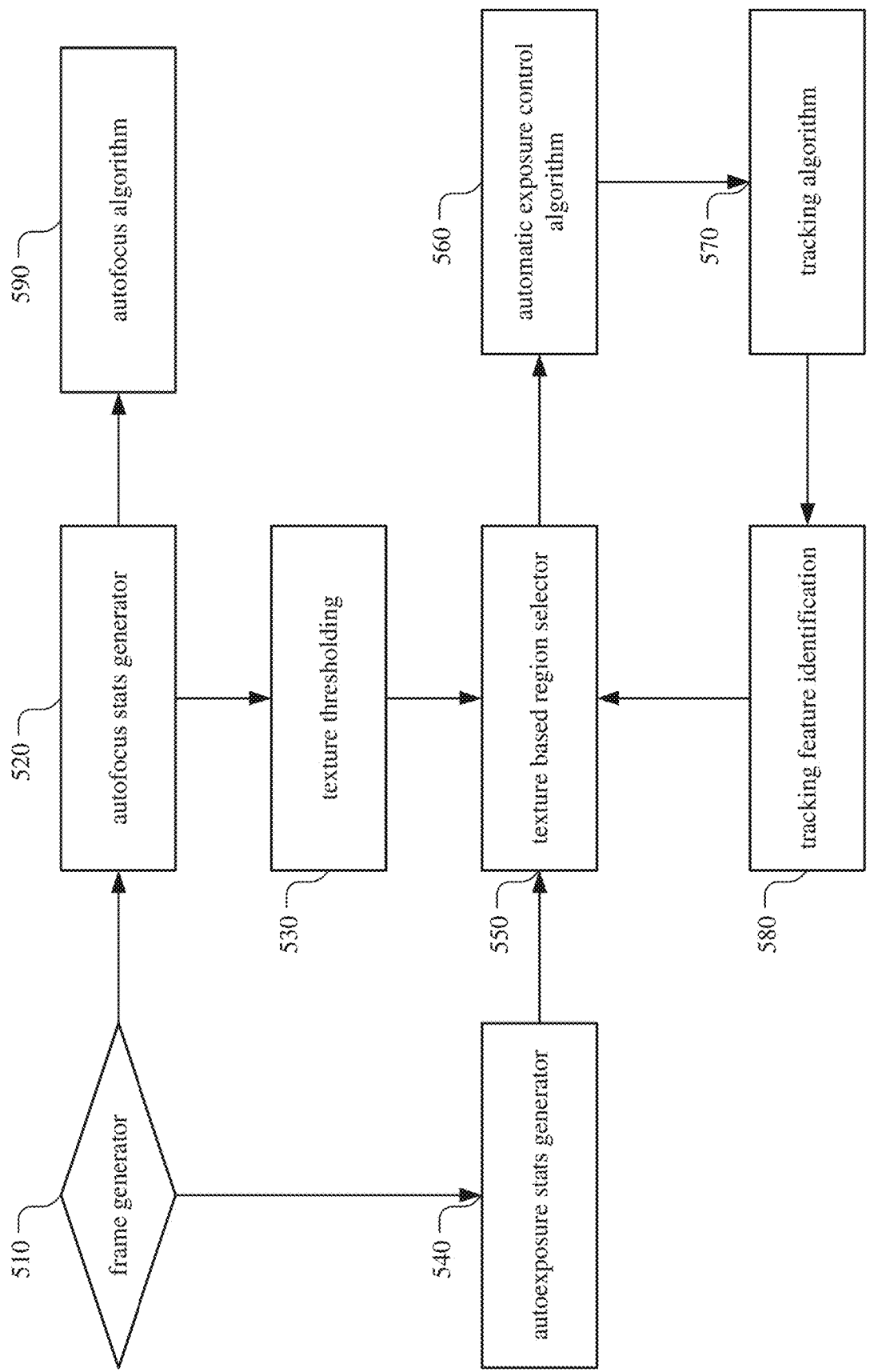
FIG. 5 is a block diagram illustrating an example embodiment of a texture based automatic exposure control (AEC) algorithm.

FIG. 5 is a block diagram illustrating an example embodiment of a texture based automatic exposure control (AEC) algorithm. At block 510, a computing system may generate a frame. Frame generation may involve one or more sensors associated with an artificial reality system. Frame generation may involve a first frame of a plurality of sequential frames comprising a video. At block 520, the computing system may generate autofocus statistics for the frame. An autofocus stats generator may generate the autofocus statistics. Autofocus statistics may comprise information representative of an amount of texture present in the frame. Autofocus statistics may also contain other information associated with a frame. An amount of texture in a frame may indicate whether the frame contains detail such as prominent features which may be used by a tracking technique such as a tracking algorithm. Autofocus stats generator may involve generating a set of autofocus statistics for a set of regions in the frame. The regions in the set may be differentiated from each other on account of their relative autofocus statistics or on account of their autofocus statistics compared to a pre-determined threshold. As an example, for each region, an autofocus statistic may be generated such that an amount of texture contained in a first region may be determined relative to an amount of texture contained in a second region. Autofocus statistics may be generated using, for example, an Infinite Impulse Response (IIR) filter, an Finite Impulse Response (FIR) filter, or a combination of both IIR and FIR. An autofocus statistic may be comprised of a piece of information such as a numerical value or multiple numerical values. Each numerical value may be associated with an IIR filter response or FIR filter response obtained from the image data. Each region of a set of regions in a frame may be associated with a respective generated autofocus statistic representing the amount of texture contained in each respective region. As an example, referring to FIG. 4A, regions 415A may comprise a set of regions, illustrated in FIG. 4A as the spatial regions of frame 400 which are contained within a two-dimensional grid of squares visually overlaid on frame 400. Each region 415A may have an autofocus statistic generated for it, representing an amount of texture contained within each respective region 415A.

At block 530, the computing system may compare the generated autofocus statistics with a threshold. The threshold may be a numerical value. The threshold may be compared against each numerical value of autofocus statistic for each region for which an autofocus statistic was generated. The threshold may be predetermined. The threshold may be determined based on numerical values generated at block 520. Using the threshold, the computing system may determine whether a frame region contains sufficient texture. If a frame region contains sufficient texture, then the region may be used for optimizing exposure by the automatic exposure control (AEC) algorithm and may be selected at block 550, described below. Thus at block 530, the computing system may determine, for each region for which autofocus statistics were generated, whether the region contains a threshold amount of texture. In particular embodiments, the step corresponding to texture thresholding may operate as a filter, by determining, for a set of frame regions, which region may be utilized by the AEC algorithm and which may not be utilized. Regions associated with a texture value below the threshold may be filtered out at block 550, described below, and thus not considered by the AEC algorithm. The computing system may discard information related to those regions, or otherwise mask it so it is not considered by the AEC algorithm. Block 530 may be performed on a set of regions, or may be performed on a single region, or may be performed on a subset of a set regions.

At block 540, the computing system may generate autoexposure statistics for the frame. An autoexposure stats generator may generate the autoexposure statistics. Autoexposure statistics may comprise information representative of brightness details present in the frame. Autoexposure statistics may also contain other information associated with a frame. Autoexposure statistics may indicate the current brightness of the frame. Autoexposure statistics may also be used to determine whether a region of the frame is too bright or too dark. Autoexposure stats generator may involve generating a set of autoexposure statistics for a set of regions in the frame. The regions in the set may be differentiated from each other on account of their relative or absolute autoexposure statistics. As an example, an absolute autoexposure statistic of a region may indicate that the region is too bright. As another example, for each region, an autoexposure statistic may be generated such that a brightness (or dimness) of a first region may be determined relative to an amount of brightness (or dimness) of a second region. An autoexposure statistic may be comprised of a piece of information such as a numerical value. Each region of a set of regions in a frame may be associated with a respective generated autoexposure statistic representing the amount of brightness (or dimness) of each respective region. As an example, referring again to FIG. 4A, regions 415A may comprise a set of regions, illustrated in FIG. 4A as the spatial regions of frame 400 which are contained within a two-dimensional grid of squares visually overlaid on frame 400. Each region 415A may have an autoexposure statistic generated for it, representing an amount of brightness (or dimness) of each respective region 415A.

At block 550, the computing system may select a region of interest (ROI) for the frame. The ROI may be comprised of a region or regions of the frame for which the statistics generated at the blocks 520 and 540 exceed the texture threshold at block 530. The ROI may be comprised of regions that may be utilized by the automatic exposure control (AEC) algorithm for making exposure decisions. For instance, the regions which at block 530 were associated with texture values which exceeded the texture threshold may be selected by the computing system at block 550 as part of the ROI. Additional regions may also be selected as part of the ROI at this block based on other criteria to be discussed below. Region selection may involve determining, for a set of frame regions, which region may be utilized by the AEC algorithm and which may not be utilized. Regions associated with a texture value above the threshold may be selected as part of the ROI. Regions associated with a texture value below the texture threshold may be filtered out and thus not considered by the AEC algorithm. The computing system may discard information related to those regions with a low texture value, or otherwise mask information associated with those regions so it is not considered by the AEC algorithm. Block 550 may be performed on a set of regions, or may be performed on a single region, or may be performed on a subset of a set regions of a frame.

Figure 6:
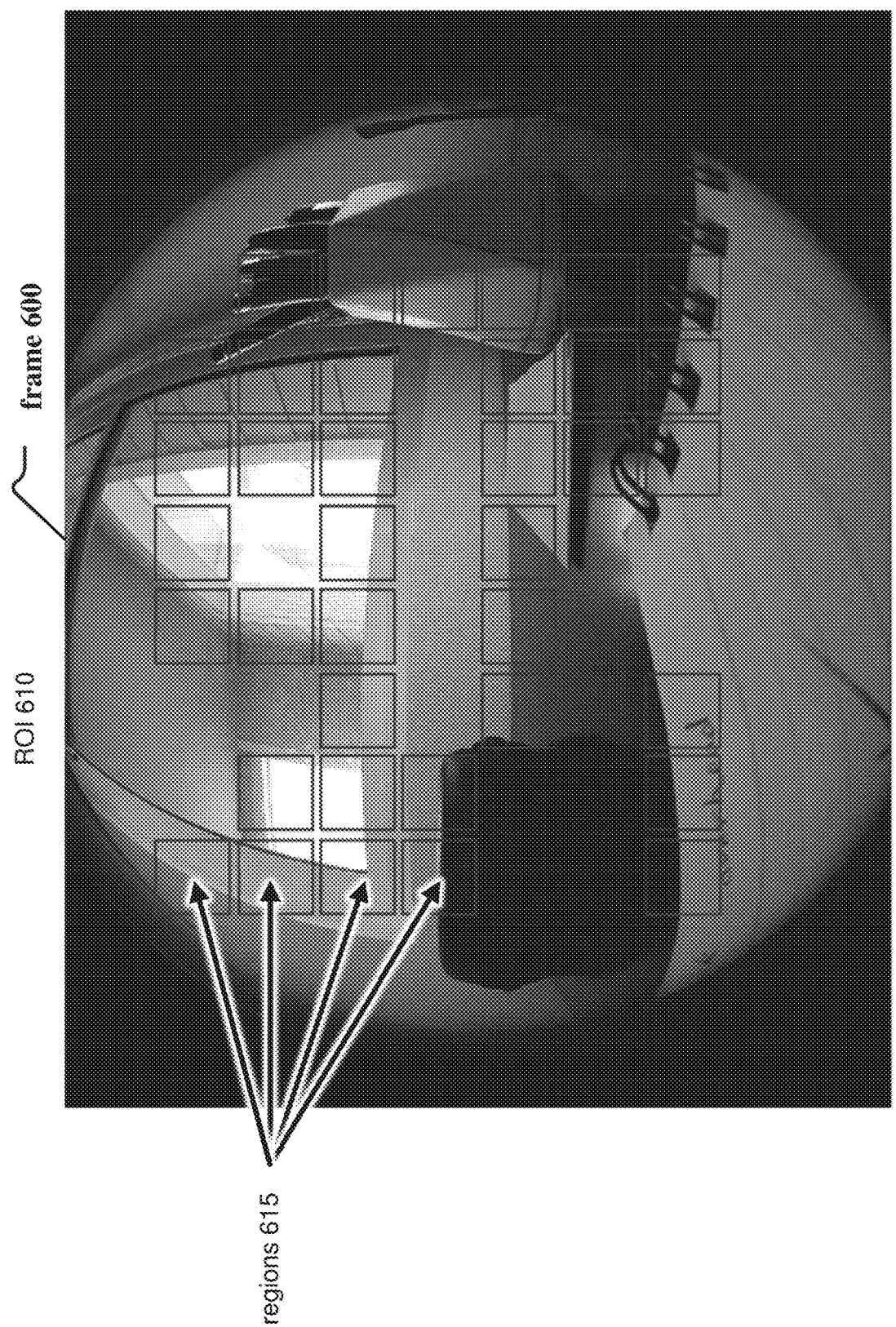
FIG. 6 illustrates an exemplary texture based automatic exposure control (AEC) region of interest (ROI) of a frame captured by a sensor associated with an artificial reality system.

FIG. 6 illustrates an exemplary texture based automatic exposure control (AEC) region of interest (ROI) of a frame captured by a sensor associated with an artificial reality system. In FIG. 6, ROI 610 is shown as a two-dimensional grid of squares visually overlaid on frame 600. ROI 610 may be a subset of regions previously generated for the frame. ROI 610 may be the result of selecting, from the regions previously generated for the frame, one or more regions 615 which contain a threshold amount of texture. ROI 610 may be the result of discarding, from the regions previously generated for the frame, one or more regions (not pictured) which do not contain a threshold amount of texture.

Referring again to FIG. 5, at block 560, the computing system may utilize the automatic exposure control (AEC) algorithm. The AEC algorithm may use as input information on those regions which were selected by the texture based region selector at block 550 as part of the ROI. As previously explained, the information on those regions may include autofocus statistics, autoexposure statistics, or some combination of the two. Using the region information, the AEC algorithm may determine an output. The output may comprise an exposure time for the frame sensor, a gain, or both. As an example, a camera capturing a sequence of frames may use the exposure time and/or gain output by the AEC algorithm on the next frame in the sequence.

At block 570, the computing system may utilize a tracking algorithm or other tracking technique to track the position or movement of a device in three-dimensional space. The tracking algorithm may track identified feature points in a sequence of frames over time. The tracking algorithm may use detail information such as prominent features in a region of a frame, such as detail information determined to be contained within the frame regions which were selected at block 550. The tracking algorithm may be used to determine a tracking output. The tracking output may be a movement trajectory of the device in three-dimensional space, or may be one or more tracked feature points in three-dimensional space, or may be a combination of both. The tracking algorithm may include a prediction element whereby a trajectory of the device within three-dimensional space may be predicted. For example, a feature contained within a first region of a first frame may be contained within a second region of a second frame, where the second frame is sequentially after the first frame. In this example, the feature may appear in a second region of the second frame that is different from the first region which it appeared in within the first frame—i.e., a device having a camera may have moved between the capture of the first and second frames such that the tracked feature appears in a different location in the environment relative to the perspective of the camera. Trajectory of such feature points may be used by the tracking algorithm to track device location in three-dimensional space. In particular embodiments, the tracking algorithm may use all detected feature points, and in other embodiments, may select one or more of the detected features points and discard or disregard other feature points. In particular embodiments, the tracking algorithm may assign a weight to one or more feature points, the weight being representative of an amount of importance the feature point may have in the tracking algorithm and an amount of influence the feature point may have over the algorithm's output (e.g., trajectory prediction).

Artificial reality systems may also benefit from automatic exposure control (AEC) techniques that take into account that prominent features in a frame may have already been identified by a tracking algorithm or other tracking technique. To add additional temporal consistency to an AEC algorithm, it may be beneficial to identify, in an image frame, a region or regions which contain features that were previously used by a tracking technique to ensure that they are optimally exposed in a subsequent frame. The application of this technique may be particularly useful when a sensor captures a sequence of frames (e.g., as a video) and a computing system is using the sequence of frames to determine a current orientation of a device having a sensor (e.g., a camera associated with an artificial reality display device worn by a user). Prominent features used by a tracking algorithm may be identified as feature points located within a subsequent frame. Computing systems may utilize tracking techniques to track the feature points over time, for example, by identifying the locations of feature points in subsequent frames in a sequence of frames. Tracked points may be used to determine device movement trajectory in three-dimensional space, as previously explained. Some tracked points may be used by a prediction technique to predict the temporal trajectory of a device.

Referring again to FIG. 5, at block 580, detail information used for tracking, such as feature points, may be identified. A computing system may determine one or more feature points that a tracking algorithm used with respect to a previous frame, and identify those feature points within the current frame in a sequence of frames. The computing system may further determine a region of the current frame containing one or more of those feature points. In particular embodiments, this information may be used by the texture based region selector at block 550. At block 550, a region of the current frame containing a feature point which was previously tracked (as determined at block 580) may be selected. As previously explained, the computing system at block 550 may select a region or regions of the frame for which the statistics generated at the blocks 520 and 540 may be utilized by the automatic exposure control (AEC) algorithm. In particular embodiments, this may allow the AEC algorithm to take into account those regions having sufficient texture (as determined at block 530), as well as those regions containing previously tracked feature points (as determined at block 580).

At block 590, the computing system may utilize an autofocus algorithm to determine an autofocus output (e.g., an autofocus configuration including a focal plane). In particular embodiments, the autofocus algorithm may be used to determine an optimized camera lens position. The autofocus algorithm may improve sharpness and/or focus of the frame. The autofocus algorithm may use as input the autofocus statistics generated at block 520.

Blocks 510-590 may be repeated. As an example, a camera capturing a sequence of frames may use the exposure time and/or gain output by the AEC algorithm on the next frame in the sequence. The texture based AEC algorithm may act as an ongoing exposure control to improve exposure in a continuously-captured sequence of frames (i.e., as a continuously-captured video) of the environment. In particular embodiments, when a sensor captures a sequence of frames (e.g., as a video), the data is provided by such sensor may be used by the computing systems 110 to determine a device's current orientation and provide that orientation to the rendering engine to orient/reorient the virtual camera in the 3D space. The texture based AEC algorithm, by basing its exposure and/or gain output only on frame regions containing useful detail information, may improve the determination of a device's current orientation.

Figure 7:
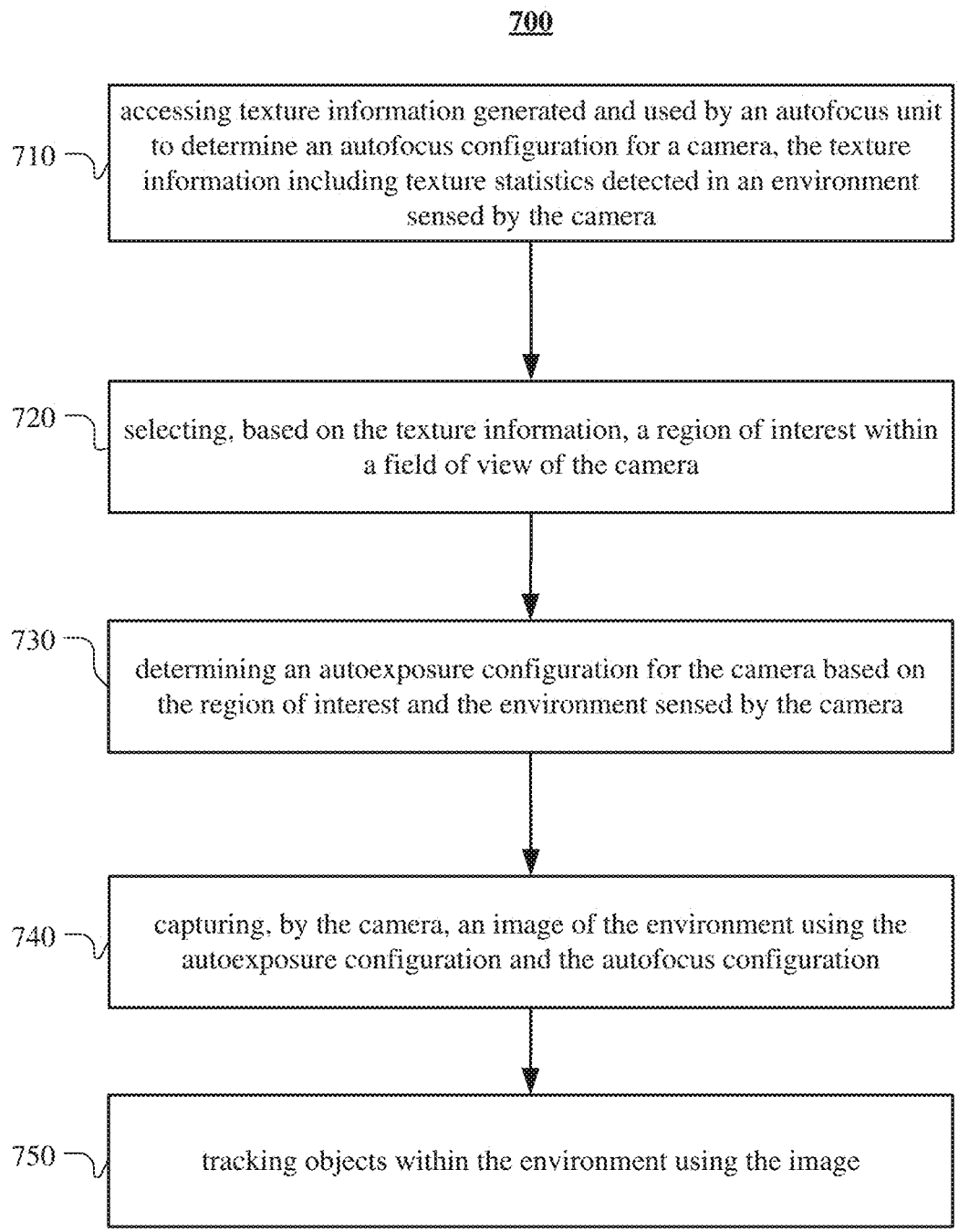
FIG. 7 illustrates an example method for tracking objects within the environment.

FIG. 7 illustrates an example method 700 for tracking objects within an environment. The method may begin at step 710, where texture information generated and used by an autofocus unit to determine an autofocus configuration for a camera is accessed, the texture information including texture statistics detected in an environment sensed by the camera. At step 720, a region of interest within a field of view of the camera is selected based on the texture information. At step 730, an autoexposure configuration for the camera based on the region of interest and the environment sensed by the camera is configured. At step 740, an image of the environment using the autoexposure configuration and the autofocus configuration is captured by the camera. At step 750, objects within the environment are tracked using the image. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method including the particular steps of the method of FIG. 7, this disclosure contemplates any suitable method including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
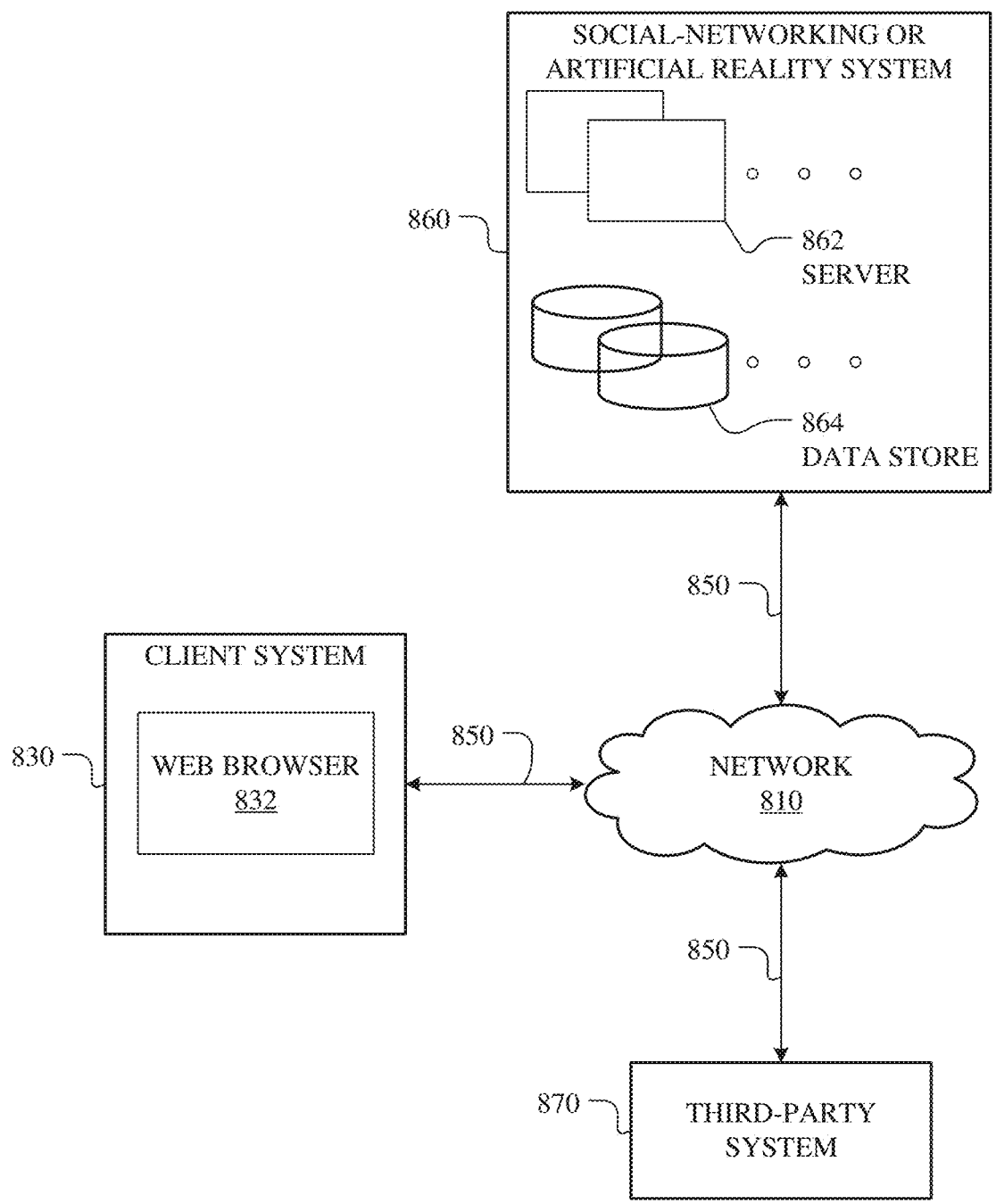
FIG. 8 illustrates an example network environment associated with a social-networking system.

FIG. 8 illustrates an example network environment 800 associated with an artificial reality or social-networking system. Network environment 800 includes a client system 830, an artificial reality or social-networking system 860, and a third-party system 870 connected to each other by a network 810. Although FIG. 8 illustrates a particular arrangement of client system 830, artificial reality or social-networking system 860, third-party system 870, and network 810, this disclosure contemplates any suitable arrangement of client system 830, artificial reality or social-networking system 860, third-party system 870, and network 810. As an example and not by way of limitation, two or more of client system 830, artificial reality or social-networking system 860, and third-party system 870 may be connected to each other directly, bypassing network 810. As another example, two or more of client system 830, artificial reality or social-networking system 860, and third-party system 870 may be physically or logically co-located with each other in whole or in part. Moreover, although FIG. 8 illustrates a particular number of client systems 830, artificial reality or social-networking systems 860, third-party systems 870, and networks 810, this disclosure contemplates any suitable number of client systems 830, artificial reality or social-networking systems 860, third-party systems 870, and networks 810. As an example and not by way of limitation, network environment 800 may include multiple client system 830, artificial reality or social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, artificial reality or social-networking system 860 may be a network-addressable computing system that may host an online Virtual Reality environment or social network. artificial reality or social-networking system 860 may generate, store, receive, and send social-networking data, such as, for example, user-profile data, concept-profile data, social-graph information, or other suitable data related to the online social network. Social-networking or artificial reality system 860 may be accessed by the other components of network environment 800 either directly or via network 810. As an example and not by way of limitation, client system 830 may access social-networking or artificial reality system 860 using a web browser, or a native application associated with social-networking or artificial reality system 860 (e.g., a mobile social-networking application, a messaging application, another suitable application, or any combination thereof) either directly or via network 810. In particular embodiments, social-networking or artificial reality system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking or artificial reality system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database.

Although this disclosure describes or illustrates particular types of databases, this disclosure contemplates any suitable types of databases. Particular embodiments may provide interfaces that enable a client system 830, a social-networking or artificial reality system 860, or a third-party system 870 to manage, retrieve, modify, add, or delete, the information stored in data store 864.

In particular embodiments, social-networking or artificial reality system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking or artificial reality system 860 may provide users of the online social network the ability to communicate and interact with other users. In particular embodiments, users may join the online social network via social-networking or artificial reality system 860 and then add connections (e.g., relationships) to a number of other users of social-networking or artificial reality system 860 to whom they want to be connected. Herein, the term "friend" may refer to any other user of social-networking or artificial reality system 860 with whom a user has formed a connection, association, or relationship via social-networking or artificial reality system 860.

In particular embodiments, social-networking or artificial reality system 860 may provide users with the ability to take actions on various types of items or objects, supported by social-networking or artificial reality system 860. As an example and not by way of limitation, the items and objects may include groups or social networks to which users of social-networking or artificial reality system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or artificial reality system 860 or by an external system of third-party system 870, which is separate from social-networking or artificial reality system 860 and coupled to social-networking or artificial reality system 860 via a network 810.

In particular embodiments, social-networking or artificial reality system 860 may be capable of linking a variety of entities. As an example and not by way of limitation, social-networking or artificial reality system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking or artificial reality system 860. In particular embodiments, however, social-networking or artificial reality system 860 and third-party systems 870 may operate in conjunction with each other to provide social-networking services to users of social-networking or artificial reality system 860 or third-party systems 870. In this sense, social-networking or artificial reality system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or artificial reality system 860 also includes user-generated content objects, which may enhance a user's interactions with social-networking or artificial reality system 860. User-generated content may include anything a user can add, upload, send, or "post" to social-networking or artificial reality system 860. As an example and not by way of limitation, a user communicates posts to social-networking or artificial reality system 860 from a client system 830. Posts may include data such as status updates or other textual data, location information, photos, videos, links, music or other similar data or media. Content may also be added to social-networking or artificial reality system 860 by a third-party through a "communication channel," such as a newsfeed or stream.

In particular embodiments, social-networking or artificial reality system 860 may include a variety of servers, subsystems, programs, modules, logs, and data stores. In particular embodiments, social-networking or artificial reality system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or artificial reality system 860 may also include suitable components such as network interfaces, security mechanisms, load balancers, failover servers, management-and-network-operations consoles, other suitable components, or any suitable combination thereof. In particular embodiments, social-networking or artificial reality system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or artificial reality system 860 to one or more client systems 830 or one or more third-party system 870 via network 810. The web server may include a mail server or other messaging functionality for receiving and routing messages between social-networking or artificial reality system 860 and one or more client systems 830. An API-request server may allow a third-party system 870 to access information from social-networking or artificial reality system 860 by calling one or more APIs. An action logger may be used to receive communications from a web server about a user's actions on or off social-networking or artificial reality system 860. In conjunction with the action log, a third-party content-object log may be maintained of user exposures to third-party content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking or artificial reality system 860. A privacy setting of a user determines how particular information associated with a user may be shared. The authorization server may allow users to opt in to or opt out of having their actions logged by social-networking or artificial reality system 860 or shared with other systems (e.g., third-party system 870), such as, for example, by setting appropriate privacy settings. Third-party content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
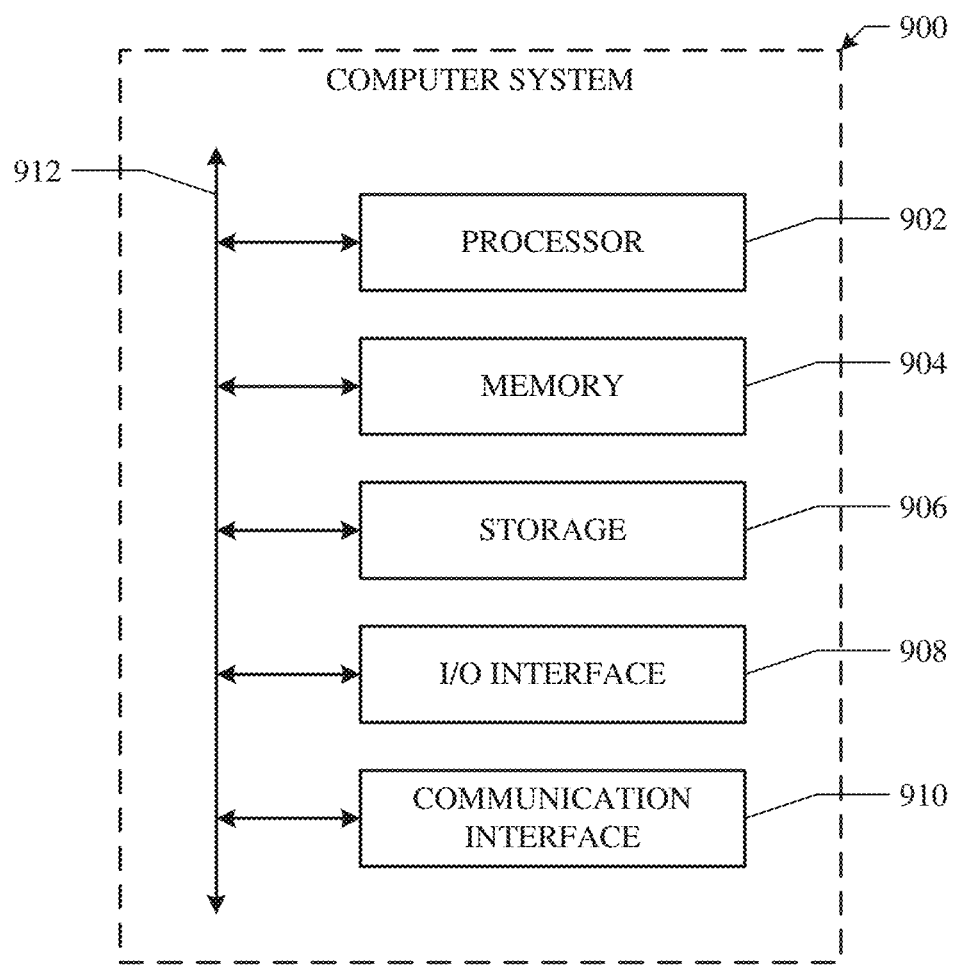
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/artificial reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising,
   accessing texture information generated and used by an autofocus unit to determine an autofocus configuration for a camera, the texture information including texture statistics associated with a plurality of regions detected in an environment sensed by the camera, wherein the texture statistics comprise a plurality of texture values associating each region in the plurality of regions with an amount of texture present in the region;
   selecting, based on the texture statistics, a region of interest comprising one or more regions within a field of view of the camera;
   determining an autoexposure configuration for the camera based on the region of interest and the environment sensed by the camera;
   capturing, by the camera, an image of the environment using the autoexposure configuration and the autofocus configuration; and
   tracking objects within the environment using the image.

2. The method of claim 1, wherein the camera is on an artificial reality device worn by a user.

3. The method of claim 1, wherein the image captured by the camera comprises a first frame in a sequence of frames captured by the camera.

4. The method of claim 1, further comprising:
   determining autoexposure information including autoexposure statistics for the region of interest; and
   using the autoexposure information in the determination of the autoexposure configuration.

5. The method of claim 1, wherein the texture statistics are determined based on one or more of an infinite impulse response (IIR) filter and a finite impulse response (FIR) filter.

6. The method of claim 1, wherein selecting the region of interest based on the texture statistics comprises:
   assigning, for each of the plurality of regions within the field of view of the camera, a corresponding texture value based on the texture statistics;
   comparing, for each of the plurality of regions, the corresponding texture value to a predetermined texture threshold; and
   determining, for each of the plurality of regions, whether the corresponding texture value exceeds the predetermined texture threshold.

7. The method of claim 6, wherein selecting the region of interest based on the texture statistics further comprises:
   selecting one or more of the regions of the plurality of regions having a texture value which exceeds the predetermined texture threshold; and
   discarding texture information of one or more of the regions of the plurality of regions having a texture value which is lower than the predetermined texture threshold.

8. The method of claim 6, wherein the autoexposure configuration is determined by an automatic exposure control (AEC) algorithm using as an input the texture statistics of the one or more regions comprising the region of interest.

9. The method of claim 1, further comprising:
   receiving a feature point associated with a trackable object in the environment;
   identifying, on an image captured by the camera, a location of the feature point;
   identifying a region of the image containing the location;
   selecting a portion of the field of view of the camera comprising the region containing the location; and
   determining the autoexposure configuration based on the region of interest.

10. One or more computer-readable non-transitory non-volatile storage media embodying software that is operable when executed to:
    access texture information generated and used by an autofocus unit to determine an autofocus configuration for a camera, the texture information including texture statistics associated with a plurality of regions detected in an environment sensed by the camera, wherein the texture statistics comprise a plurality of texture values associating each region in the plurality of regions with an amount of texture present in the region;
    select, based on the texture statistics, a region of interest comprising one or more regions within a field of view of the camera;
    determine an autoexposure configuration for the camera based on the region of interest and the environment sensed by the camera;
    capture, by the camera, an image of the environment using the autoexposure configuration and the autofocus configuration; and
    track objects within the environment using the image.

11. The computer-readable non-transitory non-volatile storage media of claim 10, wherein the camera is on an artificial reality device worn by a user.

12. The computer-readable non-transitory non-volatile storage media of claim 10, wherein the image captured by the camera comprises a first frame in a sequence of frames captured by the camera.

13. The computer-readable non-transitory non-volatile storage media of claim 10, wherein the software is further operable when executed to:
determine autoexposure information including autoexposure statistics for the region of interest; and
use the autoexposure information in the determination of the autoexposure configuration.

14. The computer-readable non-transitory non-volatile storage media of claim 10, wherein selecting the region of interest based on the texture statistics comprises:
assigning, for each of the plurality of regions within the field of view of the camera, a corresponding texture value based on the texture statistics;
comparing, for each of the plurality of regions, the corresponding texture value to a predetermined texture threshold; and
determining, for each of the plurality of regions, whether the corresponding texture value exceeds the predetermined texture threshold.

15. The computer-readable non-transitory non-volatile storage media of claim 14, wherein selecting the region of interest based on the texture statistics further comprises:
selecting one or more of the regions of the plurality of regions having a texture value which exceeds the predetermined texture threshold; and
discarding texture information of one or more of the regions of the plurality of regions having a texture value which is lower than the predetermined texture threshold.

16. The computer-readable non-transitory non-volatile storage media of claim 14, wherein the autoexposure configuration is determined by an automatic exposure control (AEC) algorithm using as an input the texture statistics of the one or more regions comprising the region of interest.

17. The computer-readable non-transitory non-volatile storage media of claim 10, wherein the software is further operable when executed to:
receive a feature point associated with a trackable object in the environment;
identify, on an image captured by the camera, a location of the feature point;
identify a region of the image containing the location;
select a portion of the field of view of the camera comprising the region containing the location; and
determine the autoexposure configuration based on the region of interest.

18. The computer-readable non-transitory non-volatile storage media of claim 10, wherein the texture statistics are determined based on one or more of an infinite impulse response (IIR) filter and a finite impulse response (FIR) filter.

19. A system comprising:
one or more processors; and
one or more computer-readable non-transitory non-volatile storage media coupled to one or more of the processors and comprising instructions operable when executed by one or more of the processors to cause the system to:
access texture information generated and used by an autofocus unit to determine an autofocus configuration for a camera, the texture information including texture statistics associated with a plurality of regions detected in an environment sensed by the camera, wherein the texture statistics comprise a plurality of texture values associating each region in the plurality of regions with an amount of texture present in the region;
select, based on the texture statistics, a region of interest comprising one or more regions within a field of view of the camera;
determine an autoexposure configuration for the camera based on the region of interest and the environment sensed by the camera;
capture, by the camera, an image of the environment using the autoexposure configuration and the autofocus configuration; and
track objects within the environment using the image.

20. The system of claim 19, wherein the texture statistics are determined based on one or more of an infinite impulse response (IIR) filter and a finite impulse response (FIR) filter.

* * * * *